May 31, 1960     F. FAHNOE ET AL     2,938,839

URANIUM DIOXIDE IMPREGNATED COMPACTS AND METHOD FOR MAKING SAME

Filed July 30, 1954     3 Sheets-Sheet 1

INVENTORS
FREDERICK FAHNOE
JAMES J. SHYNE

BY

ATTORNEY

May 31, 1960  F. FAHNOE ET AL  2,938,839
URANIUM DIOXIDE IMPREGNATED COMPACTS AND METHOD FOR MAKING SAME
Filed July 30, 1954  3 Sheets-Sheet 2

INVENTORS
FREDERICK FAHNOE
JAMES J. SHYNE
BY
ATTORNEY

United States Patent Office 2,938,839
Patented May 31, 1960

2,938,839

URANIUM DIOXIDE IMPREGNATED COMPACTS AND METHOD FOR MAKING SAME

Frederick Fahnoe, Morristown, and James J. Shyne, Arlington, N.J., assignors to Vitro Corporation of America, Verona, N.J.

Filed July 30, 1954, Ser. No. 446,953

6 Claims. (Cl. 204—1.5)

Our invention is directed toward impregnated porous bodies or compacts and methods for making the same.

In the latter part of the nineteenth century, certain experimenters discovered that when a diaphragm formed from a porous body containing channels of capillary dimensions was inserted in a tube filled with liquid and a potential was applied at the ends of the capillary, the liquid moved toward one end or the other, depending upon the direction of the electrostatic field established by the applied potential, the type of fluid, and the composition of the diaphragm. This process was defined as electro-osmosis or electro-endosmosis.

Similarly, it was discovered that when two electrodes were inserted in a fluid containing a colloidal dispersion of particles of solid material and a potential was applied across the electrodes, the particles would deposit out of the fluid on one or the other electrode, depending on the direction of the electrostatic field and the particle composition. This process was defined as electrophoresis or catophoresis.

All these processes are presently believed to be explained through application of one scientific theory; i.e., the theory of the electric double layer. This theory states that when a liquid is brought into contact with a solid, a very thin charged film of one polarity (called the solid film) is formed at the surface of the solid in contact with the liquid, and a similar layer of opposing polarity (called the liquid film) is formed at the surface of the liquid in contact with the solid. These films are not separated but form a common layer defined as the electric double layer.

The theory further states that when an electric potential is applied across such a layer, the oppositely charged portions of the layer are torn away from each other and relative mechanical motion occurs between the liquid and solid phase, while the surface films immediately and continuously reform to replace the torn portions.

When the solid phase is held in place as in electro-osmosis, the mobile liquid phase moves; when the liquid phase is held in place as in electrophoresis, the mobile solid phase moves. (The deposition in electrophoresis occurs because of the attraction between the charged particles and the oppositely charged electrode.)

Many attempts have been made to exploit the above processes commercially. Thus, techniques have been developed for forcing liquid into the interstices or capillaries of a porous compact. Furthermore, techniques are known for the electrophoretic deposition of solid material within the pores of an extremely thin porous coating which has been previously applied over the surface of a relatively non-porous body.

However, as far as is known to us, methods have been developed using these techniques which can force solid material into the interstices of a porous compact and thus produce an impregnated body.

We have discovered that through the combined use of electro-osmosis and electrophoresis, which dual action we define as electrokinetic action, we not only can completely saturate a porous compact with solid packing material but can also control the degree of impregnation and localize the impregnated areas with great precision within the extreme limits of zero to complete saturation.

Accordingly, it is an object of the present invention to provide new and improved impregnated bodies of the character indicated and novel methods for producing such bodies.

It is a further object to provide a novel process for regulating the porosity of a porous compact through controlled electrokinetic impregnation.

Still another object is to provide a porous compact, selected sections of which have been electrokinetically impregnated to a predetermined extent.

These and other objects of the invention will either be explained or will become apparent to those skilled in the art when the specification is studied in conjunction wit the accompanying drawings wherein.

In our invention, a porous compact is brought into contact with liquid media containing a gross dispersion of electrically charged particles. An electrostatic field is established which extends through the media and the compact. Under the resultant electrokinetic action, the charged particles are forced into the interstices or pores of the compact along a front which gradually penetrates the pores by moving in along the periphery of the compact. The extent and rate of the impregnation process is mainly dependent upon the following parameters: the liquid porosity and average pore size of the compact; the strength o fthe electrostatic field; the dispersion concentration; the average size of the charged particles; and the length of the impregnation period. By accurately selecting and controlling values of these parameters, precise control of the compact porosity is obtained between the extremes of zero impregnation to complete saturation. If selected surface areas of the compact are masked or otherwise prevented from particle penetration, or if the relative compact-field orientation is changed at various times as the impregnation process is continued, selected sections of the compact can be impregnated to a predetermined extent while other sections remain completely or partially unsaturated.

Figure 1:
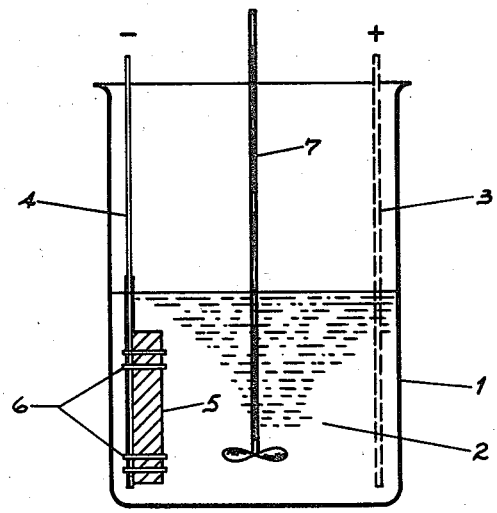
Figure 1 is a vertical sectional view through a first type of apparatus for impregnating a porous compact in accordance with the invention.

Referring to Figure 1, a beaker 1 contains a gross dispersion of charged particles 2. These particles can be charged either positively or negatively; for the purposes of illustration, these particles will be assumed to carry a positive charge. Two electrodes, a porous steel anode 3 and a masked solid stainless steel cathode 4 are immersed within the dispersion at opposite sides of the beaker. A rectangular shaped porous compact 5 is attached to the cathode by rubber bands 6. A direct potential with the indicated polarity is applied across the electrodes; cathode 4 and compact 5 are negatively charged and anode 3 is positively charged. In order to maintain a uniform dispersion distribution, stirring rod 7 is continuously agitated within the beaker.

By virtue of the applied potential, an electrostatic field is established which extends between compact 5 and anode 3 and which acts on the dispersion to cause migration toward the compact. The electrophoretic action causes the particles to move toward the compact; at this point, the electro-osmotic action forces the fluid into the pores of the compact and carries the particles along with the fluid.

Figure 3:
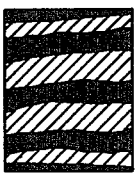
Figure 3 is a sectional greatly enlarged view of an impregnated porous compact in accordance with the invention.

The particles are forced into the compact in a front which moves in along the periphery of the compact as shown in Figure 3.

Figure 4:
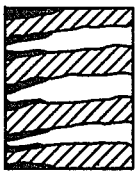
Figures 4 and 5 are sectional greatly enlarged views of a porous compact in various stages of impregnation in accordance with the present invention.
Figure 5:
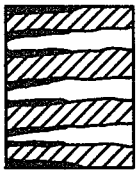

Initially, as shown in Figure 4, the particles are deposited close to the surface of the compact (the charged particles are, of course, attracted to the oppositely charged inner walls of the compact) and form constrictions within the various pore openings. As the impregnation process continues, the particles are carried through the constricted openings and penetrate further into the compact as shown in Figure 5. This process continues until the compact becomes saturated as shown in Figure 3.

If anode 3 is replaced by a porous hollow cylindrical anode open at both ends and mounted concentrically about cathode 4, a cylindrically shaped compact can be readily impregnated.

The electrodes in Figure 1 are shown to be vertically parallel. If one electrode is inclined from the vertical, the direction of the electrostatic field is altered and path of the advanced impregnation front is altered accordingly.

Figure 2:
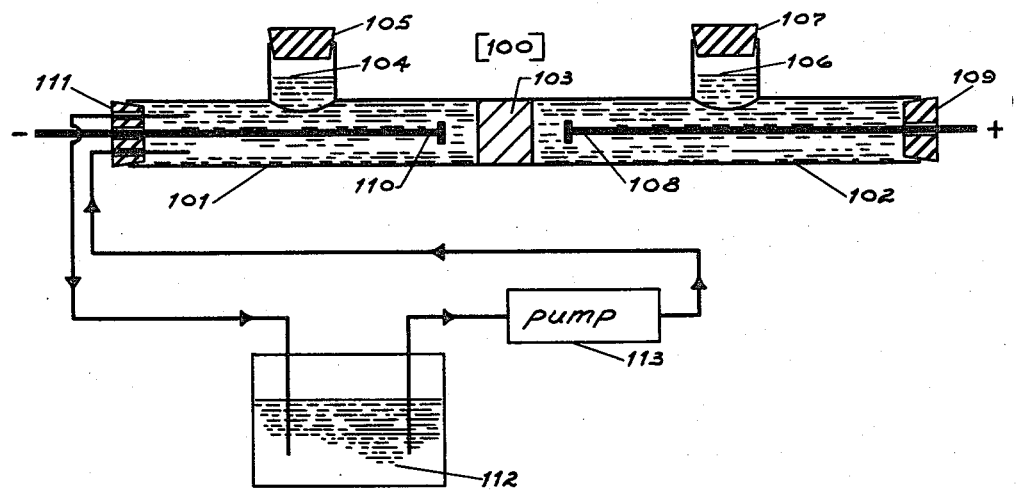
Figure 2 is a vertical sectional view through a second type of apparatus for impregnating a porous compact in accordance with the invention.

Figure 2 shows an impregnation cell which can be used to impregnate various shaped compacts, including spheroids. The cell is identified generally as 100 and includes two T-shaped cylindrical reservoirs 101 and 102 separated from each other by a porous compact 103. Reservoir 101 is filled with liquid media carrying the dispersed particles through use of neck 104 normally sealed with cork 105. Reservoir 102 is filled with the same liquid media through use of neck 106 normally sealed with cork 107. An electrode 108 is inserted in reservoir 102 and one end of this electrode extends through an opening in cork 109 which seals the end of reservoir 102 remote from compact 103. Similarly an electrode 110 is inserted in reservoir 101 and one end of this electrode extends through an opening in cork 111 which seals the end of reservoir 101 remote from compact 103. In order to maintain a constant uniformly distributed dispersion in reservoir 101, the dispersion is pumped from a large tank 112 through an opening of cork 111 into reservoir 101 by pump 113 and is withdrawn from another opening in cork 111 and returned to tank 112. A direct potential with polarity indicated is applied between the electrodes, and the impregnation process proceeds as previously outlined.

The following examples set forth certain well defined instances of the application of this invention. They are, however, not to be considered as limitations thereof, since many modifications may be made without departing from the spirit and scope of this invention.

*Example I*

Bulk uranium dioxide was ball milled to produce uranium dioxide particles having an average diameter on the order of 1 micron. A gross dispersion containing 3% by weight of these particles in isopropyl alcohol was prepared and poured into the beaker apparatus shown in Figure 1.

A clay bonded silicon carbide compact was prepared having the approximate external dimensions of ¼" by 1" by 2", an initial porosity of approximately 38% and an approximate density of 1.75 grams per cubic centimeter. This compact was vacuum saturated with alcohol and then strapped to the masked electrode with rubber bands and inserted in the dispersion.

The anode-cathode separation was adjusted to 8.5 centimeters and a direct voltage of 1000 volts was applied across the electrodes for a period of 6 hours. At the end of this period, the compact was removed from the dispersion and heated to approximately 40° C. until all the alcohol contained therein was evaporated. Subsequent analysis revealed that the compact had been substantially uniformly impregnated with 36% by weight of uranium dioxide.

Figure 6:
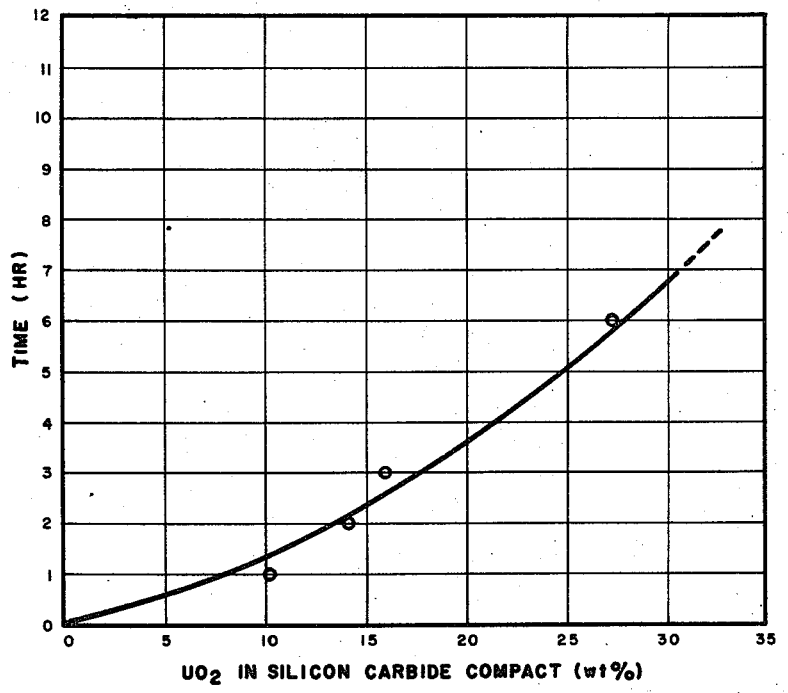
Figures 6, 7 and 8 are graphs showing the interrelation of various impregnation parameters.

This experiment was repeated and cross-sectional analyses of the compact were made at various times, the results being substantially as shown in Figures 3, 4 and 5. In addition, data was taken to determine the rate of impregnation and the results are indicated on the graph shown in Figure 6 wherein the percent impregnation is plotted against elapsed time.

Figure 7:
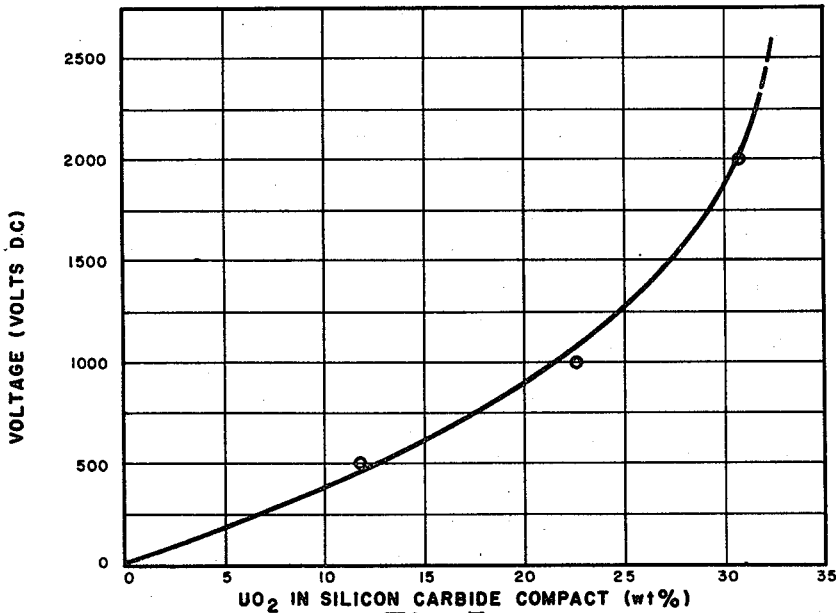

This experiment was repeated for a constant 6 hour period using the same dispersion concentration and different applied voltages. The results are indicated on the graph shown in Figure 7 wherein the percent impregnation is plotted against varied applied voltages.

Figure 8:
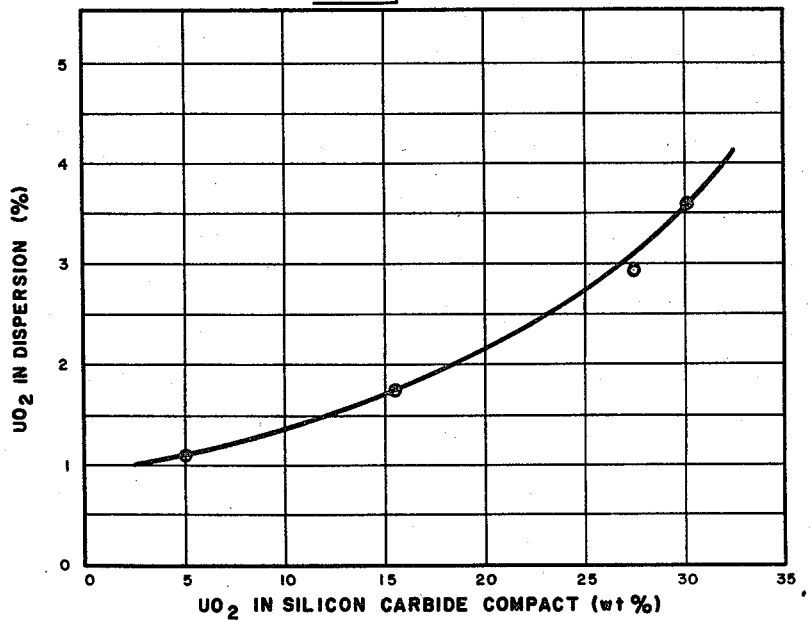

This experiment was repeated for a constant 6 hour period, maintaining a constant applied voltage and different dispersion concentrations. The results are indicated on the graph shown in Figure 8 wherein the percent impregnation is plotted against varying dispersion concentrations.

*Example II*

The silicon carbide compact used in Example I was replaced by a porous stainless steel compact of approximately the same dimensions and having an initial porosity of approximately 40%. The impregnation process was repeated under the same conditions. Subsequent analysis revealed that the compact had been substantially uniformly impregnated with 6.5% by weight of uranium dioxide.

*Example III*

Bulk nickel oxide was ball milled to produce nickel oxide particles having an average diameter on the order of 1 micron. A gross dispersion containing 2.1% by weight of these particles in isopropyl alcohol was prepared and poured into both reservoir 101 and tank 112 of the apparatus shown in Figure 2. Isopropyl alcohol was poured into reservoir 102.

A clay bonded silicon carbide compact of the type described in Example I having an average pore diameter falling within the range 10 to 20 microns and having an initial liquid porosity of 35% was vacuum saturated in alcohol and then inserted in the apparatus shown in Figure 2. The electrode spacing was adjusted to 2.2 inches and a direct voltage of 2000 volts was applied across the electrodes with the polarity indicated for a period of 24 hours. Subsequent analysis revealed that the compact had been impregnated with 13% by weight of nickel oxide.

*Example IV*

The Example III procedure was repeated with the same type compact for the same 24 hour period using a 6.7% concentration of nickel oxide, an electrode spacing of 1.0 inch and an applied voltage of 500 volts. Subsequent analysis revealed that the compact had been impregnated with 7.7% by weight of nickel oxide.

*Example V*

The Example III procedure was repeated with the same type compact for the same 24 hour period using a 6.7% concentration of nickel oxide, an electrode spacing of 1.0 inch and an applied voltage of 2000 volts. Subsequent analysis revealed that the compact had been impregnated with 25% by weight of nickel oxide.

*Example VI*

A 3.4% concentration by weight of lead iodide crystals (average particle diameter approximately 1 micron) was prepared in the manner described above and substituted for the nickel oxide dispersion in the apparatus shown in Figure 1. The silicon carbide compact was replaced by an electrode grade porous carbon compact having an average pore diameter of approximately 2 microns and an initial liquid porosity of 16%.

The electrode spacing was adjusted to 1.0 inch and a direct voltage of 2000 volts was applied across the electrode for a period of 24 hours. Subsequent cross-sectional analysis revealed that the compact had been impregnated with 3% by weight of lead iodide, the heaviest concentration being near the surface of the compact.

It will be apparent that if the average diameter size of the particles is as large or larger than the average pore diameter, complete impregnation cannot occur although the pores of the compact can be sealed off at the surface; a situation often desirable. Further, if the average particle size is smaller than the pore size but of the same order of magnitude as shown in Example VI, the pore constrictions referred to previously will be so large as to limit the ultimate depth of penetration and thus produce a porous body having an impregnated zone which extends inwardly from the outer surface to a predetermined depth which is a function of the particle diameter-pore diameter ratio. For optimum results when complete impregnation is desired, the average particle diameter should be on the order of $\frac{1}{10}$ or less as large as the average pore diameter.

In our copending application S. N. 386,882, filed October 19, 1953, now Patent No. 2,848,391, dated August 19, 1958, and concerned with electrophoretic deposition, we disclose certain types of liquid carriers and materials capable of being colloidally dispersed. We have discovered that the same limitations apply to the dispersions used herein; i.e., the liquid carrier must be a relatively anhydrous non-conductive fluid having a conductivity falling within the range $10^{-5}$ to $10^{-8}$ ohm-cm. and the materials used must have an average particle diameter falling within the range $\frac{1}{100}$ to 50 microns and must be capable of being colloidally dispersed either in stable form or colloidally dispersed through forced agitation or by the use of peptizing agents. Further information will be found in this copending application.

Both electrically conductive and electrically non-conductive porous bodies can be impregnated by our process, although as indicated by the above examples, non-conductors are more easily impregnated than conductors. It is believed that this effect may be explained by the existence of potential gradients established within the non-conductors by virtue of the applied electrostatic field which act to attract incoming particles to the surface of highest potential within the body; this surface is necessarily that in contact with the adjacent electrode. As is well known, no such gradients exist within electrical conductors, as the entire body is at substantially the same potential.

While we have shown and pointed out and described the fundamental novel features of the invention, it will be understood that various omissions and substitutions and changes can be made by those skilled in the art without departing from the spirit of the invention. It is our intention, therefore, to be limited only as indicated by the scope of the claims which follow.

We claim:

1. A porous compact of a material of the group consisting of silicon carbide, stainless steel and carbon whose pores have a predetermined average diameter, said pores being filled with electrophoretically-deposited solid particles of uranium dioxide having a maximum average diameter which is on the order of $\frac{1}{10}$ as large as said average pore diameter the average diameter of said particles being within the range $\frac{1}{100}$ to 50 microns.

2. A porous body of a material of the group consisting of silicon carbide, stainless steel and carbon, the pores of which have a predetermined average diameter, the pore openings communicating with the outer surface of said body being sealed with electrophoretically-deposited solid particles of uranium dioxide whose average diameter is less than said average pore diameter the average diameter of said particles being within the range $\frac{1}{100}$ to 50 microns.

3. A porous body of a material of the group consisting of silicon carbide, stainless steel and carbon, the pores of which have a predetermined diameter, a selected volume section of said body which extends inward from a portion of the outer surface of said body having all its pores saturated with electrophoretically-deposited solid particles of uranium dioxide whose maximum average diameter is less than said predetermined core diameter, the average diameter of said particles being within the range $\frac{1}{100}$ to 50 microns.

4. The method of electrokinetically impregnating a porous compact with solid particles of uranium dioxide having average diameter within the range $\frac{1}{100}$ to 50 microns, said compact being a material of the group consisting of silicon carbide, stainless steel and carbon, comprising the steps of immersing said compact in organic liquid media having conductivity within the range $10^{-5}$ to $10^{-8}$ ohm-cm. containing a gross dispersion of said particles, all of said particles carrying electric charges of the same polarity; and establishing a constant electrostatic field extending through said compact and said media, said field being polarized in a direction at which said particels are attracted toward said compact and are deposited within the pores thereof.

5. The method as set forth in claim 4 wherein the pores of said compact have a known average diameter and the average particle diameter varies between the limits of $\frac{1}{10}$ to $\frac{1}{100}$ of said average pore diameter.

6. The method of electrokinetically impregnating a porous compact with solid particles of uranium dioxide having average diameter within the range $\frac{1}{100}$ to 50 microns, said compact being a material of the group consisting of silicon carbide, stainless steel and carbon, comprising the steps of immersing said compact in organic liquid media having conductivity within the range $10^{-5}$ to $10^{-8}$ ohm-cm. containing a gross dispersion of said particles, all of said particles carrying electric charges of the same polarity; and establishing a constant electrostatic field extending through said media and terminating at said compact, said field being polarized in a direction at which said compact is charged oppositely to said particles whereby said particles are attracted toward said compact and deposit themselves within the pores thereof.

References Cited in the file of this patent

UNITED STATES PATENTS

| | | |
|---|---|---|
| 1,837,050 | Janbert | Dec. 15, 1931 |
| 1,922,221 | Steenbeck | Aug. 15, 1933 |
| 2,191,666 | Kieffer | Feb. 27, 1940 |
| 2,491,866 | Kurtz | Dec. 20, 1949 |
| 2,696,661 | Kalischer | Dec. 14, 1954 |

FOREIGN PATENTS

| | | |
|---|---|---|
| 656,566 | Germany | Feb. 9, 1938 |
| 691,859 | Great Britain | May 20, 1953 |